(12) United States Patent
Yamaguchi

(10) Patent No.: US 12,216,647 B1
(45) Date of Patent: Feb. 4, 2025

(54) SYSTEMS AND METHODS FOR MACHINE LEARNING EVALUATION PIPELINE

(71) Applicant: WOVEN BY TOYOTA, INC., Tokyo (JP)

(72) Inventor: Koichiro Yamaguchi, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 18/353,401

(22) Filed: Jul. 17, 2023

(51) Int. Cl.
*G06F 16/242* (2019.01)

(52) U.S. Cl.
CPC ................ *G06F 16/2425* (2019.01)

(58) Field of Classification Search
CPC .............. G06F 16/906; G06F 16/908
See application file for complete search history.

(56) References Cited

U.S. PATENT DOCUMENTS

| | | |
|---|---|---|
| 2021/0056378 A1 | 2/2021 | Yang et al. |
| 2021/0334624 A1 | 10/2021 | Hua et al. |
| 2022/0101089 A1* | 3/2022 | Abdelfattah ............. G06N 3/08 |
| 2022/0188599 A1* | 6/2022 | Dai ....................... G06F 18/217 |
| 2022/0414426 A1* | 12/2022 | Zhou ..................... G06N 3/0442 |
| 2023/0063686 A1 | 3/2023 | Li et al. |
| 2023/0325664 A1* | 10/2023 | Yuan ..................... G06N 3/0985 |
| | | 706/27 |

FOREIGN PATENT DOCUMENTS

| | | | |
|---|---|---|---|
| CN | 114444654 A | * | 5/2022 |
| CN | 116051964 A | * | 5/2023 |

* cited by examiner

*Primary Examiner* — Apu M Mofiz
*Assistant Examiner* — Oscar Wehovz
(74) *Attorney, Agent, or Firm* — Sughrue Mion, PLLC

(57) ABSTRACT

Provided are a method, system, and device for a neural architecture search (NAS) pipeline for performing an optimized neural architecture search (NAS). The method may include obtaining a first search space comprising a plurality of candidate layers for a neural network architecture; performing a training-free NAS in the first search space to obtain a first set of architectures; obtaining a second search space based on the first set of architectures; performing a gradient-based search in the second search space to obtain a second set of architectures; performing a sampling method search utilizing the second set of architectures as an initial sample; and obtaining an output architecture as an output of the sampling method search.

14 Claims, 7 Drawing Sheets

SYSTEMS AND METHODS FOR MACHINE LEARNING EVALUATION PIPELINE

TECHNICAL FIELD

Systems and methods consistent with example embodiments of the present disclosure relate to providing a pipeline for evaluation machine learning models.

BACKGROUND

In the related art, a neural network may generally be characterized by two main parameters: (1) its architecture; and (2) the weights applied to inputs transmitted between neurons. Typically, the architecture is manually or hand-designed by a user, while the weights are optimized by training the network with a training set and neural network algorithm. Thus, to optimize performance of the neural network, the architecture design is an important consideration, particularly as it is generally static once the neural network is deployed for use. FIG. 1 illustrates an example of a neural network architecture in the related art.

Referring to FIG. 1, the example neural network architecture in the related art may be defined by its connections, layer types (or operations), number of layers, and the number of channels in each layer. The layer types may include, for example, convolutional (in the case of a convolutional neural network (CNN)), activation (e.g., rectified linear unit (ReLU)), pooling, fully connected, batch normalization, dropout, etc. The architectural design of a network is embodied by a combination of layers corresponding to at least some of these layer types.

In the related art, neural architecture search (NAS) is a technique for automatically designing the architecture of a neural network. Related art methods for performing NAS may include a training-free (zero-shot) NAS, a SuperNet-based NAS, and a straightforward iterative search.

In the related art, a training-free (zero-shot) NAS predicts the network performance without training any network parameters. While this method is fast, it may not have good accuracy. For example, this may be done by evaluation metrics or architectures in the search space, without actually performing training.

FIG. 2 illustrates a SuperNet-based (gradient-based) NAS according to the related art. FIG. 3 illustrates an example super block in the SuperNet-based NAS, and FIG. 4 illustrates an example flow of a SuperNet-based NAS method according to the related art.

A SuperNet-based (gradient-based) NAS may use a SuperNet. The SuperNet is a network of all candidate architectures. Referring to FIG. 2, the SuperNet-based search searches for a neural network architecture via a single training process of plural connected super blocks, with each super block corresponding to one layer (and/or one set of layers) and including many choices of candidate layers (and/or sets of layers). For example, Choice 1 may be a 3×3 CNN, Choice 2 may be a 5×5 CNN, Choice 3 may be a max pooling or residual block, etc. In the SuperNet-based search, the best layer is searched for and selected in each super block. As shown in FIGS. 3 and 4, each candidate has a $\theta$ value (or architecture parameter), which is updated via the training process. That is, if a candidate is determined to have contributed significantly to reducing loss, its $\theta$ value (representing the importance of the candidate layer) is increased through back propagation, and vice-versa. After the architecture parameter $\theta$ is updated in an iteration of the SuperNet-based search, weight parameters are updated using training images (e.g., image of a car). The process is repeated until some level of network stability is reached (i.e., some latency or loss is reached) or until a predetermined number of iterations has been completed. Once the training is complete, the best layer (i.e., layer having highest $\theta$ value) is selected for each super block in order to generate the final (optimal) network architecture.

FIG. 5 is a functional block diagram of a sampling method according to the related art. Referring to FIG. 5, the sampling method is an iterative process by which a controller generates a sample architecture candidate (e.g., from a search space of a set of layers). The sample architecture is optimized via training and evaluated to obtain metric values (e.g., accuracy, latency, model size, etc.). Based on the evaluation results of the previous sample, the controller then generates a next sample architecture candidate using a method such as reinforcement learning, Bayesian optimization or an evolutionary algorithm. This process is repeatedly performed until a target performance is reached (e.g., until a target accuracy, latency, mode size, etc., is obtained).

The sampling method exemplified in FIG. 5 may result in the most accurate/optimal architecture, but since it involves many trainings, it is extremely time consuming to perform across a large amount of candidates.

While performing NAS manually (as is common in the related-art systems) may ensure higher quality of architectures, it is extremely time-consuming and burdensome for the user. Automating NAS is thus desirable.

However, the existing methods described above for automating the NAS in the related art can be time consuming, and may not result in an optimal network architecture. In particular, if the search space is large, it will take too much resources and time to complete. On the other hand, if the search space is too small, it will most likely result in a sub-optimal architecture with poor performance. Accordingly, there is a need for a method for NAS which can find a network with optimal performance in minimal time.

SUMMARY

According to embodiments, methods, systems and devices are provided for a neural architecture search (NAS) pipeline for performing an optimized neural architecture search (NAS). In particular, apparatuses and methods according to example embodiments may perform training-free NAS, SuperNet/gradient-based search, and sampling method search in sequence, so as to reduce the number of architectures that need to be trained at the end of the search for the sampling method, while ensuring that the quality of the architectures which are provided at the end of the search for the sampling method are high. Thus, the overall quality/optimal architectures can be found in minimal time.

According to embodiments, a method for performing a neural architecture search (NAS) may be provided. The method may include: obtaining a first search space comprising a plurality of candidate layers for a neural network architecture; performing a training-free NAS in the first search space to obtain a first set of architectures; obtaining a second search space based on the first set of architectures; performing a gradient-based search in the second search space to obtain a second set of architectures; performing a sampling method search utilizing the second set of architectures as an initial sample; and obtaining an output architecture as an output of the sampling method search.

According to some embodiments, the first search space may be obtained based on a set of architecture parameters.

The second search space may be obtained based on a sub-space which contain one or more architectures in the first set of architectures.

According to some embodiments, the sampling method search may be performed iteratively. The sampling method search may include an evolutionary search algorithm. A number of iterations of the sampling method search may be based on a predetermined threshold. The training-free NAS may be performed based on one or more metrics.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
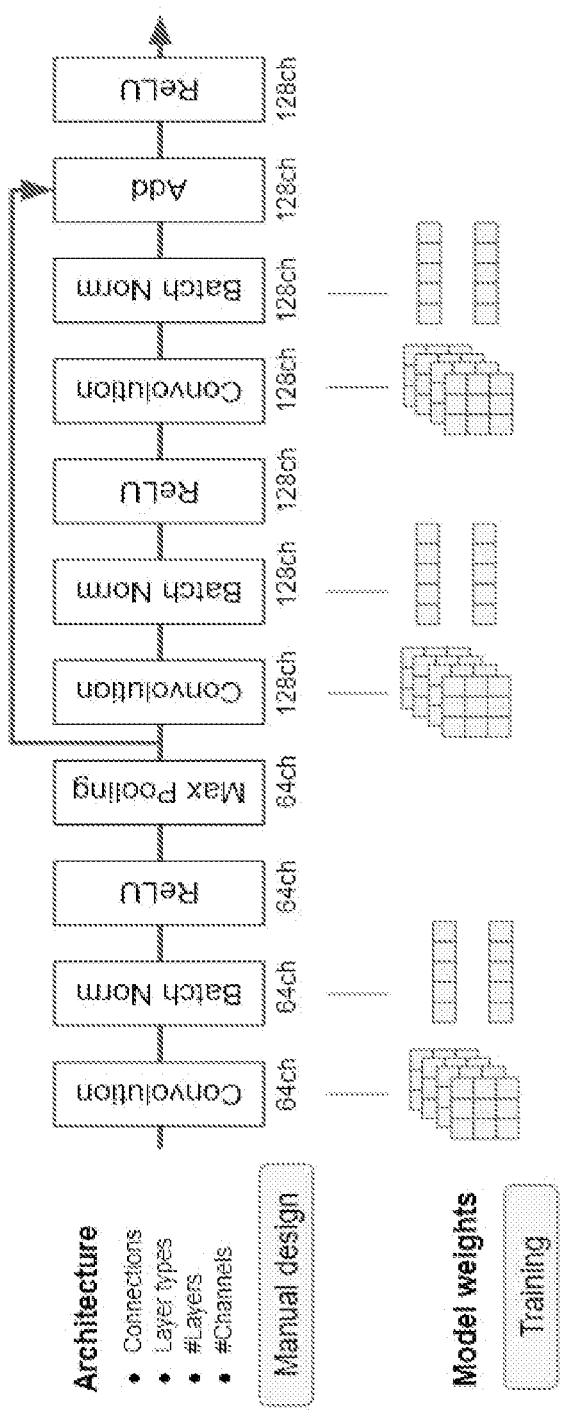
FIG. 1 illustrates an example neural network architecture according to the related art.
Figure 2:
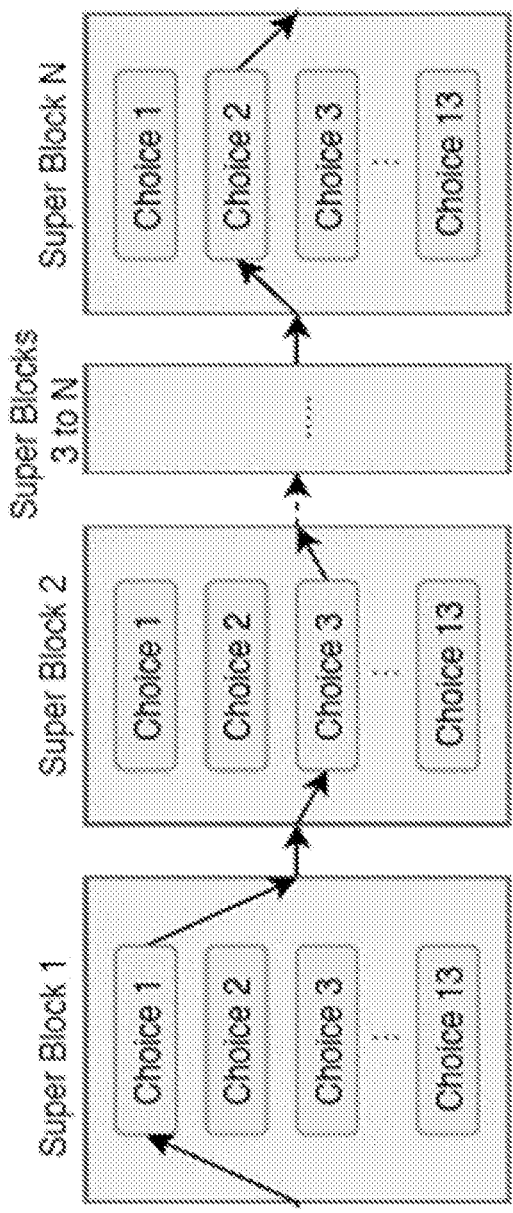
FIG. 2 illustrates a functional block diagram of a SuperNet-based (gradient-based) search method according to the related art.
Figure 3:
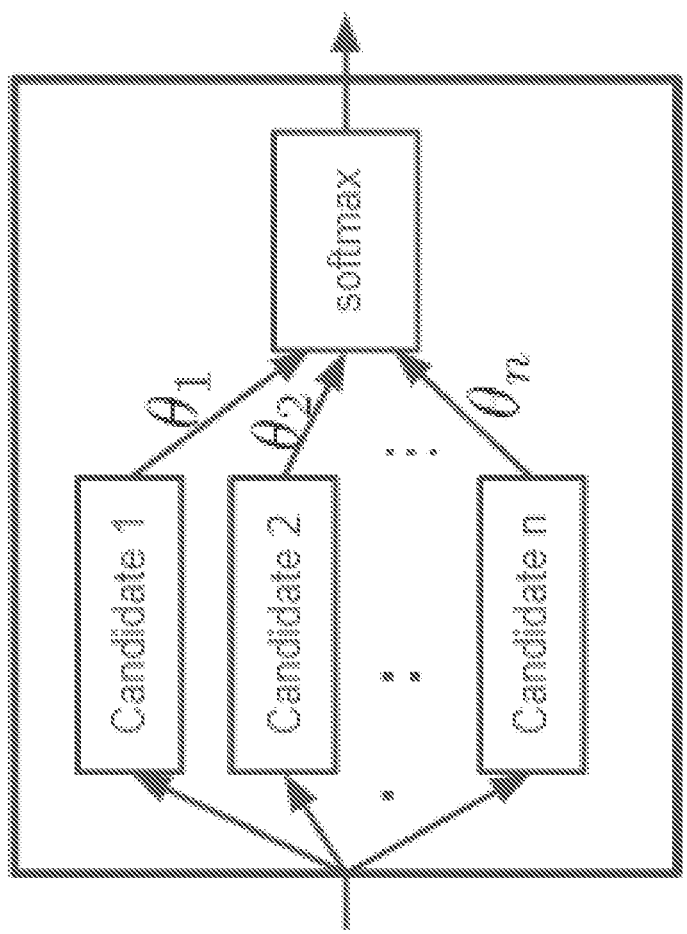
FIG. 3 illustrates an example super block in a SuperNet-based search method according to the related art.
Figure 4:
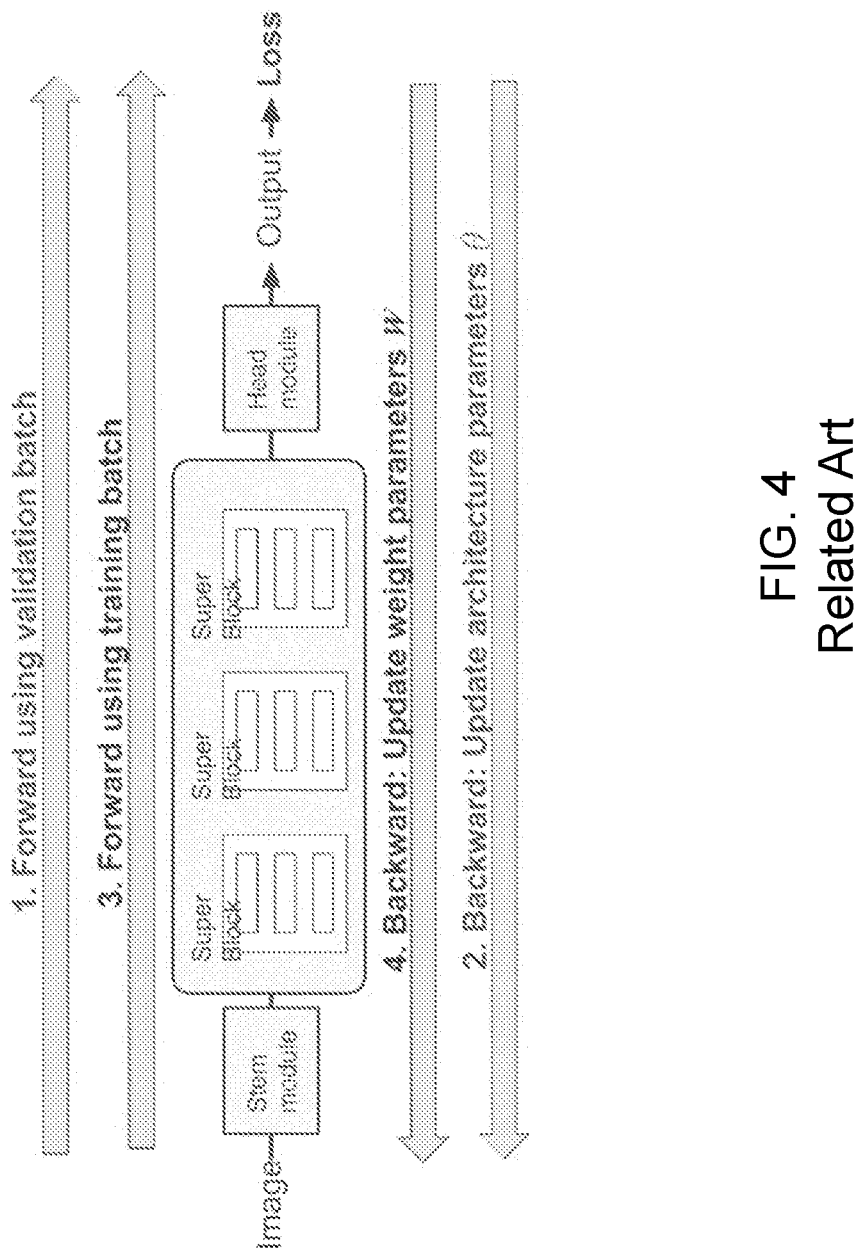
FIG. 4 illustrates a flow diagram of a SuperNet-based search method according to the related art.
Figure 5:
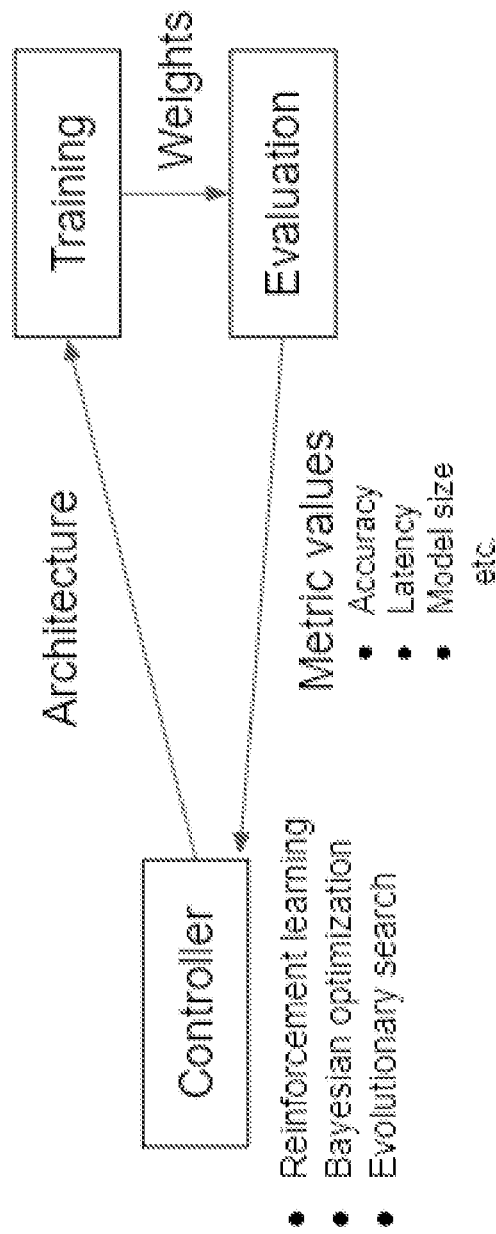
FIG. 5 illustrates a functional block diagram of a sampling method according to the related art.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Examples embodiments of the present disclosure provides a method and a system for performing training-free NAS, SuperNet/gradient-based search, and sampling method search in sequence, so as to reduce the number of architectures that need to be trained at the end of the search for the sampling method, while ensuring that the quality of the architectures which are provided at the end of the search for the sampling method are high. Thus, the overall quality/optimal architectures can be found in minimal time.

Figure 6:
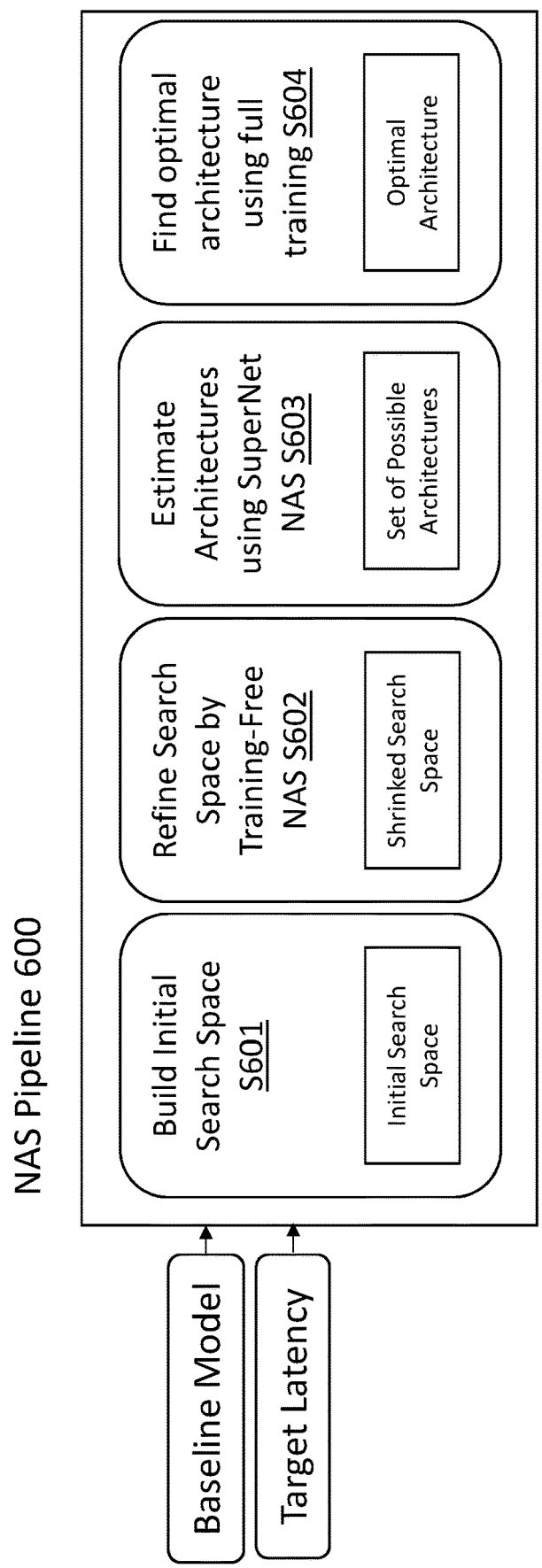
FIG. 6 illustrates an example neural architecture search (NAS) pipeline, according to one or more embodiments.

FIG. 6 illustrates an example of a neural architecture search (NAS) pipeline 600. Referring to FIG. 6, a baseline model and/or a target latency for the desired architecture may be provided (e.g., input by a user) to NAS pipeline 600. This may be useful for providing the initial search space, especially since the initial search space can be generated based on the baseline model, and the target latency may be used to filter out architectures which do not match the target latency.

Referring to FIG. 6, at operation S601, an initial first search space may be obtained (e.g., built). The initial first search space may include a plurality of candidate layers for neural network architectures. According to embodiments, the initial first search space may be provided by the user, or obtained based on a set of architecture parameters.

Referring to FIG. 6, at operation S602, the initial first search space may be refined in order to obtain a second search space. According to embodiments, this may be performed by firstly performing a training-free NAS on the first search space to obtain a first set of architectures. It should be appreciated that the training-free NAS can use a variety of methods, as long as it does not involve training. For example, it may evaluate good architectures based on simple metrics. Accordingly, a first set of architectures may be obtained. Since no training is involved in operation S602, the speed of completion should be relatively quick.

Thereafter, the first set of architectures may be utilized to obtain a second search space. The second search space may be considered as a "reduced" or "shrinked" search space relative to the first search space. According to embodiments, a sub-space which contains and/or surrounds each architecture in the first set of architectures may be used in order to determine the second search space. For instance, if the first set of architectures comprised architectures 1, 2, and 3, sub-spaces 1, 2, and 3 may correspond to a search space (sub-space) surrounding architectures 1, 2, and 3 respectively. Accordingly, in one example, the second search space may be the union of sub-spaces 1, 2, and 3.

Referring back to FIG. 6, a SuperNet-based NAS (gradient-based search) may be performed at operation S603 using the second (shrinked) search space. This method will result in a second set of architectures which are based on the second search space. Since a gradient-based search only involves one training, it should still be relatively quick, since the second search space is already a reduced search space.

Referring back to FIG. 6, a sampling method may be performed (the full training search) at operation S604 using each architecture in the second set of architectures as the initial sample. According to embodiments, this may be an iterative full-training search. Since the second set of architectures is already relatively narrow compared to the first set of architectures, even though full-training is performed, the time is still relatively lower. Rather, since full-training is performed, the accuracy can be considered to be optimal/high. Thus, the NAS pipeline 600 may result in the optimal architecture being obtained.

According to one embodiment, the sampling method search may be an evolutionary search algorithm. The number of iterations may also be based on a predetermined threshold. In particular, an evolutionary search is performed iteratively, and may include using a performance metric or fitness/validation score in order to obtain an optimized architecture based on the second search space. According to one embodiment, in each iteration of the evolutionary search, the candidate architectures are mutated (e.g., modifying a 5×5 convolution layer to a 3×3 convolution layer) utilizing the entire search space (e.g., any possible layer, layer type, number of channels, number of layers), trained (e.g., for a few epochs), and evaluated. Then, the lowest scoring architectures in the candidate pool are replaced with new (mutated) architectures that are determined to perform better. This is repeated over several iterations until a predetermined number of iterations have been performed or until some predetermined threshold is reached (e.g., predetermined optimal performance) and an optimized architecture in the second space is output. Nevertheless, it should be appreciated that several possible criteria may be used for the threshold to select optimized architecture. While the simplest method would be to select the architecture with the highest score, if multiple metrics are being considered (e.g., accuracy and latency (runtime speed)), one example process would be to output all architectures of a Pareto-front set. Another possible method would be to use crossover during the evolutionary search process. Specifically, a low-scored architecture can be replaced with a crossover of two higher-scored architectures.

While the present embodiments described above utilize an evolutionary search, it is understood that one or more other embodiments are not limited thereto. In another embodiment, another sampling method or algorithm may be utilized (e.g., reinforcement learning).

Figure 7:
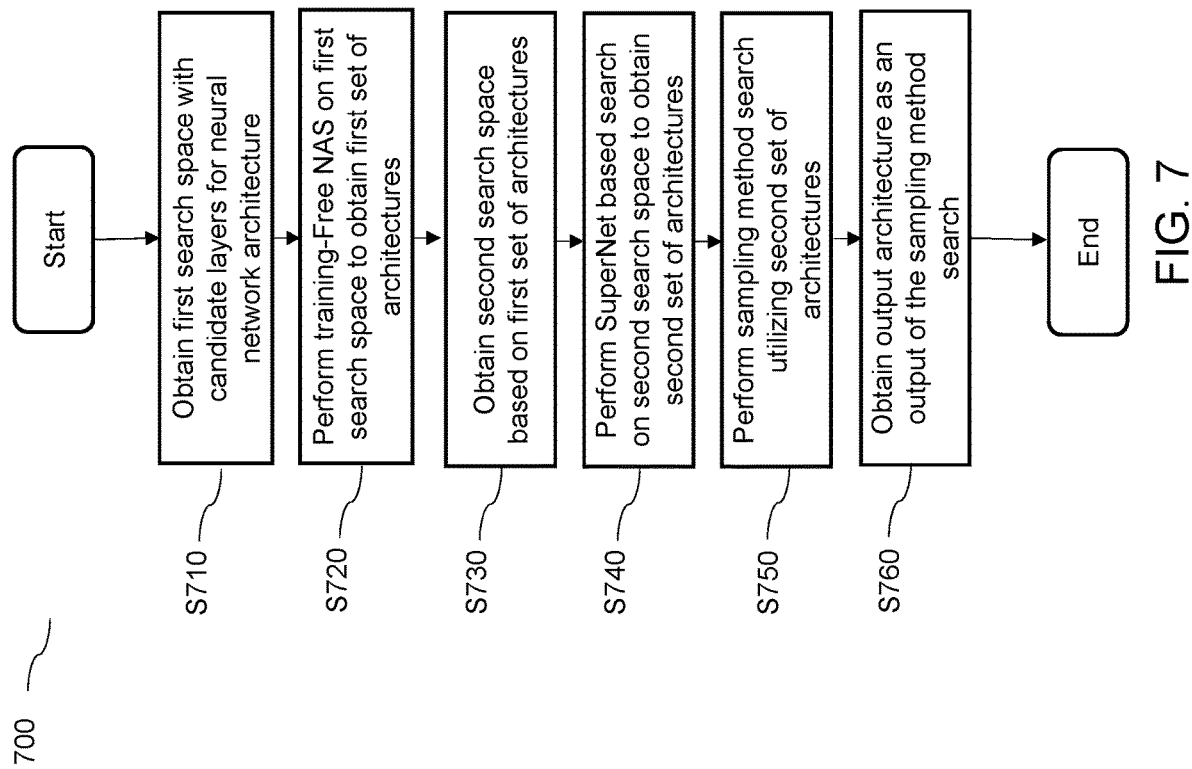
FIG. 7 illustrates a flow diagram of an example method for performing an optimized NAS process, according to one or more embodiments.

FIG. 7 illustrates a flow diagram of an example method 700 for performing an optimized NAS process. Referring to FIG. 7, at operation S710, a first search space with candidate layers for a neural network architecture is obtained. This may be similar to operation S601 described with respect to FIG. 6 above.

At operation S720, training-free NAS may be performed on the first search space in order to obtain a first set of architectures. This may be similar to portions of operation S602 described with respect to FIG. 6 above.

At operation S730, a second (shrinked) search space may be obtained based on the first set of architectures. According to some embodiments, this may be obtained based on a sub-space which contains and/or surrounds each architecture in the first set of architectures in order to determine the second search space. This may be similar to portions of operation S602 described with respect to FIG. 6 above.

At operation S740, a SuperNet-based (gradient-based) search may be performed in the second search space obtained in operation S730 in order to output a second set of architectures. This may be similar to portions of operation S603 described with respect to FIG. 6 above.

At operation S750, a sampling method may be performed by utilizing the second set of architectures obtained from operation S740 as an initial sample. According to one embodiment, the sampling method may be an evolutionary search algorithm. The evolutionary search algorithm may be repeated over a number of iterations, and this number of iterations may be based on a predetermined threshold. This may be similar to operation S604 described with respect to FIG. 6 above.

At operation S760, the optimal architecture may be output as a result of the sampling method performed in operation S750. It should also be appreciated that while the present embodiment describes outputting one optimal architecture some embodiments may output a plurality of optimal architectures.

In view of the above, examples embodiments of the present disclosure provides a method and a system for performing an optimized neural architecture search (NAS) by coarsely setting an initial search space and refining the search space, such that the speed of the search can be substantially lower, and using the refined search space in combination with SuperNet NAS and iterative sampling method search may result in architectures which have optimal performance. Accordingly, using these search methods in sequence and in combination can result in finding optimal performance architectures in substantially lower search and computational time.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method for performing a neural architecture search (NAS), the method comprising:
obtaining a first search space comprising a plurality of candidate layers for a neural network architecture; performing a training-free NAS in the first search space to obtain a first set of architectures; obtaining a second search space based on the first set of architectures;
performing a gradient-based search in the second search space to obtain a second set of architectures;
performing a sampling method search utilizing the second set of architectures as an initial sample; and
obtaining an output architecture as an output of the sampling method search, wherein the sampling method search is performed iteratively, wherein the sampling method search comprises an evolutionary search algorithm, wherein the evolutionary search algorithm of the sampling method selects, from an entirety of the search space, component blocks of a given candidate architecture, trains the given candidate architecture, scores the given candidate architecture, replaces a lowest scoring architecture in the candidate pool with the given candidate architecture, and forms a Pareto-front set from the candidate pool, and wherein the obtaining comprises obtaining the output architecture from the Pareto-front set.

2. The method according to claim 1, wherein the first search space is obtained based on a set of architecture parameters.

3. The method according to claim 1, wherein the second search space is obtained based on a sub-space which contain one or more architectures in the first set of architectures.

4. The method according to claim 1, wherein a number of iterations of the sampling method search is based on a predetermined threshold.

5. The method according to claim 1, wherein the training-free NAS is performed based on one or more metrics.

6. An apparatus for performing a neural architecture search (NAS), the apparatus comprising: at least one memory storing computer-executable instructions; and at least one processor configured to execute the computer-executable instructions to: obtain a first search space comprising a plurality of candidate layers for a neural network architecture; perform a training-free NAS in the first search space to obtain a first set of architectures; obtain a second search space based on the first set of architectures; perform a gradient-based search in the second search space to obtain a second set of architectures; perform a sampling method search utilizing the second set of architectures as an initial sample; and obtain an output architecture as an output of the sampling method search, wherein the sampling method search is performed iteratively, wherein the sampling method search comprises an evolutionary search algorithm, wherein the evolutionary search algorithm of the sampling method selects, from an entirety of the search space, component blocks of a given candidate architecture, trains the given candidate architecture, scores the given candidate architecture, replaces a lowest scoring architecture in the candidate pool with the given candidate architecture, and forms a Pareto-front set from the candidate pool, and wherein the obtaining comprises obtaining the output architecture from the Pareto-front set.

7. The apparatus according to claim 6, wherein the first search space is obtained based on a set of architecture parameters.

8. The apparatus according to claim 6, wherein the second search space is obtained based on a sub-space which contain one or more architectures in the first set of architectures.

9. The apparatus according to claim 6, wherein a number of iterations of the sampling method search is based on a predetermined threshold.

10. The apparatus according to claim 6, wherein the training-free NAS is performed based on one or more metrics.

11. A non-transitory computer-readable recording medium having recorded thereon instructions executable by at least one processor to cause the at least one processor to perform a method comprising:
obtaining a second search space based on a first set of architectures; performing a gradient-based search in the second search space to obtain a second set of architectures; performing a sampling method search utilizing the second set of architectures as an initial sample; and
obtaining an output architecture as an output of the sampling method search, wherein the sampling method search is performed iteratively, wherein the sampling method search comprises an evolutionary search algorithm, wherein the evolutionary search algorithm of the sampling method selects, from an entirety of the search space, component blocks of a given candidate architecture, trains the given candidate architecture, scores the given candidate architecture, replaces a lowest scoring architecture in the candidate pool with the given candidate architecture, and forms a Pareto-front set from the candidate pool, and wherein the obtaining comprises obtaining the output architecture from the Pareto-front set.

12. The non-transitory computer-readable recording medium according to claim 11, wherein the first search space is obtained based on a set of architecture parameters.

13. The non-transitory computer-readable recording medium according to claim 11, wherein the second search space is obtained based on a sub-space which contain one or more architectures in the first set of architectures.

14. The non-transitory computer-readable recording medium according to claim 11, wherein a number of iterations of the sampling method search is based on a predetermined threshold.

* * * * *